United States Patent [19]
Ito

[11] 3,759,555
[45] Sept. 18, 1973

[54] STRUCTURE OF BALL-AND-SOCKET JOINT USED FOR COUPLING LINK MEMBERS FOR DRIVING A WINDSHIELD WIPER FOR VEHICLES

[75] Inventor: Isao Ito, Handa, Japan
[73] Assignee: Nilkondenso Kabushiki Kaisha, Aichi-Ken, Japan
[22] Filed: Apr. 2, 1971
[21] Appl. No.: 130,577

[30] Foreign Application Priority Data
Apr. 10, 1970   Japan.................................. 45/35083
Apr. 11, 1970   Japan.................................. 45/34930
Apr. 11, 1970   Japan.................................. 45/34931

[52] U.S. Cl............................................... 287/90 D
[51] Int. Cl. ............................................ F16c 11/06
[58] Field of Search .................. 287/87, 90 R, 90 C, 287/85 A, 90 D

[56] References Cited
UNITED STATES PATENTS
3,210,105   10/1965   Vogt.................................... 287/87

FOREIGN PATENTS OR APPLICATIONS
217,804     10/1958   Australia........................... 287/90 R
1,487,153    5/1967   France................................. 287/87
920,925      3/1963   Great Britain ..................... 287/90 R Primary Examiner—Andrew V. Kundrat
Attorney—Cushman, Darby & Cushman

[57] ABSTRACT

An improved structure of the ball-and-socket joint used for coupling link members for driving a windshield wiper for vehicles, comprising a combination of a ball fixedly mounted on one of the link members, and a socket mounted in the other link member to be pivotably connected to said one link member and having a recess for slidably receiving said ball therein. The improved ball-and-socket joint is provided with means for restraining the outward expansion of a collar-like section of the socket by pressing said section over the entire outer peripheral surface thereof, which collar-like section is formed integrally with the socket extending from the peripheral edge of the recess and has a plurality of slits formed therein.

2 Claims, 12 Drawing Figures

PATENTED SEP 18 1973 3,759,555

INVENTOR

Isao ITO

BY Cushman, Darby & Cushman

ATTORNEYS

PATENTED SEP 18 1973

INVENTOR

Isao ITO

STRUCTURE OF BALL-AND-SOCKET JOINT USED FOR COUPLING LINK MEMBERS FOR DRIVING A WINDSHIELD WIPER FOR VEHICLES

This invention relates to an improved structure of the ball-and-socket joint used for coupling link members in a driving mechanism for a windshield wiper for vehicles.

Prior art ball-and-socket joints of this type include the one disclosed in French Pat. No. 1,185,952. This prior art ball-and-socket joint comprises a ball and a socket which is made of an artificial resin, such as polyamide, and formed with a recess for receiving said ball, said socket being mounted in a hole formed in a connecting rod connected to the crank arm of a wiper motor, and having an integral collar-like section extending from the peripheral edge of said recess and having a plurality of slits formed therein over the entire circumference thereof so as to facilitate the insertion of the ball into said recess. Such a ball-and-socket joint has the advantages that the structure is simple, that both the ball and the socket can be produced at low costs and that it can be assembled and disassembled easily. However, since the front glass of a vehicle is curved, it is very rare that the joints at the opposite ends of the connecting rod operate on one and the same plane during operation of the wiper, or in other words, the operating plane of each joint forms an angle to a plane perphendicular to the pivotal axis of the joint, and the wiper driving force acts in said operating plane, so that the socket is subjected to a force which urges the socket to disengage from the ball. Thus, the prior art ball-and-socket joint of the type described had the fatal drawback that the ball and the socket are occasionally disengaged from each other.

As an example of the ball-and-socket joints which are free of the above-described drawback, reference is made to the one disclosed in British Pat. No. 885,198. The ball-and-socket joint disclosed in this patent comprises a ball having an annular projecting shoulder of a larger diameter formed at the free end thereof, which is received in a through-hole of a socket similar to that of the above-described prior art joint, made of an artificial resin. By constructing the joint in the manner described above, the disengagement of the ball and socket can be prevented by the engagement of the projecting shoulder with the upper edge of the socket, even when a load is imposed on the socket to disengage said socket from the ball, due to the same reason as mentioned above. However, this type of ball-and-socket joint has the disadvantage that the configuration of the ball becomes complicated and therefore, the production of the same is troublesome. Furthermore, in assembling the ball and socket a lubricant, such as grease, is usually applied to the sliding surfaces thereof for the purpose of minimizing the friction at the sliding surface of the socket and also minimizing the coefficient of friction at said sliding surfaces so that the drive of the motor may be transmitted most efficiently, but according to the above-described prior art joint the ball extends through the through-hole of the socket, with the free end thereof exposed outside above the upper surface of the socket. Therefore, when the joint was used at a location where it is splashed with water, the lubricant was washed away, with the result that the coefficient of friction at the sliding surfaces increased and the sliding surface of the socket was readily worn out and further the loss of the driving force was extremely large. On the other hand, when the joint was used at a location where sand is allowed to attach thereto, the sliding surfaces of the ball and socket were scratched by the sand intruding therebetween and the coefficient of friction increased, resulting in wear of the sliding surface of the socket and a large loss of driving force as in the preceding case.

Such a trouble caused by water or sand is a serious problem, particularly in the light of the fact that, while the wiper was installed in the driver's cabin in the past, recently it has in most cases been installed in the engine room, for relieving the driver from the noise generated by the wiper during operation and due to the difficulty in providing a space for the installation of the wiper, and in such condition, the joint is covered with a water and dust preventing cover made of rubber or the like material. However, the use of the cover not only adds to the cost of the wiper but also renders the wiper mounting operation extremely difficult.

The present invention contemplates the provision of an improved, unique ball-and-socket joint which eliminates the disadvantages of the two prior art joints described above. Namely, the object of the present invention is to provide a highly practical ball-and-socket joint which comprises means for externally pressing the collar-like section over the entire peripheral surface thereof to restrain the outward expansion of said collar-like section, whereby the socket and the ball are maintained in tight engagement with each other, with no fear of disengagement under the driving force during operation of the wiper, and in addition, the intrusion of water or sand into the sliding surfaces of said ball and socket can be prevented.

According to the present invention, there is provided a ball-and-socket joint for use in coupling link members for driving a wiper for vehicles, comprising a ball fixedly mounted on one of said link members, and a socket mounted in a hole at one end of the other link member to be pivotably connected to said one link member and having a recess for receiving said ball, said socket having an integral collar-like section extending outwardly from the peripheral edge of said recess and having a plurality of slits formed therein over the entire circumference thereof; in which means is provided adjacent the collar-like section for restraining the outward expansion of said collar-like section by pressing it over the entire outer peripheral surface thereof.

The above and other object and advantages of the invention will become apparent from the following description taken in conjunction with the accompanying drawings in which same reference numerals indicate same or similar parts.

Figure 1:
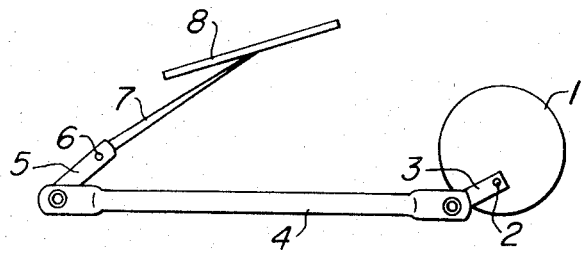
FIG. 1 is a schematic front view of an embodiment of the driving device for driving a wiper for vehicles.
Figure 2:
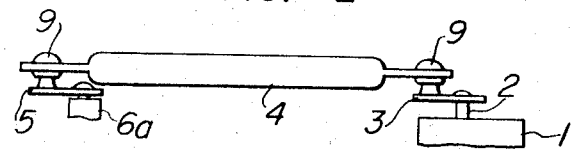
FIG. 2 is a side view of the driving device shown in FIG. 1.

In the device shown in FIGS. 1 and 2, a crank arm 3 is mounted on a spindle 2 which is driven by a wiper motor 1. The crank arm 3 is connected to one end of a connecting rod 4 through a ball-and-socket joint 9 to be described later. The other end of the connecting rod 4 is connected to a link lever 5 through another ball-and-socket joint 9. The rotational motion of the wiper motor 1 is converted into a rocking motion by the link mechanism described above, and transmitted to a pivot pin 6 mounted on a pivot holder 6a, to drive a wiper arm 7 fixed to said pin 6. Reference numeral 8 designates a wiper blade which is driven by the arm 7 to wipe the glass surface.

Figure 3:
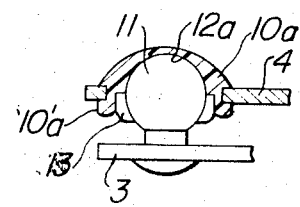
FIGS. 3 and 4 are cross-sectional views respectively showing, in an enlarged scale, the structures of conventional ball-and-socket joints used in the driving device.

The prior art ball-and-socket joint disclosed in French Pat. No. 1,185,952 mentioned above, has a structure as shown in FIG. 3. Namely, a socket 10a made of a synthetic resin, such as polyamide, is mounted in a hole formed in the connecting rod 4 and secured therein by a radial projection 10'a engaging the peripheral edge of said hole. Reference numeral 13 designates a collar-like section formed integrally with the socket 10'a which has a recess 12a for receiving a ball 11, and having a plurality of radial slits circumferentially of the section to facilitate insertion of the ball 11 into said recess. Such a structure, as stated previously, has the disadvantage that the socket 10a is disengaged from the ball 11 during operation of the wiper.

Figure 4:
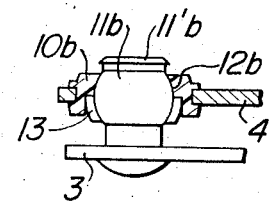

FIG. 4 shows a ball-and-socket joint of a structure as disclosed in British Pat. No. 885,198 mentioned before, and a ball 11b has an annular projecting shoulder 11'b formed at the free end thereof and is received in a through-hole 12b of a socket 10b made of a synthetic resin material, so that even when a load is imposed on the ball 11b which urges said ball to disengage from the socket 10b, the disengagement of said ball and socket is prevented by the engagement of the projecting shoulder 11'b with the inner edge of the socket 10b. However, such a structure has the drawback as set forth previously.

Figure 5:
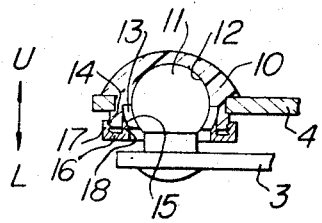
FIG. 5 is a cross-sectional view, similar to FIGS. 3 and 4, of an embodiment of the ball-and-socket joint according to the present invention.

The present invention will now be described with reference to the embodiments thereof. Describing in detail a ball-and-socket joint 9 shown in FIG. 5, a ball 11 is fixedly mounted on the crank arm 3 by way of a shank 19, while a socket 10 made of an artificial resin, such as polyamide, polyacetal or polyurethane, is provided on the connecting rod 4 by forming it integrally with or press-fitting it into a hole formed in said connecting rod. The socket 10 is formed with a recess 12 for receiving the ball 11. Further, the socket 10 has integrally formed therewith a collar-like section 13 to facilitate the insertion of the ball 11 into the recess 12, said collar-like section 13 having a plurality of slits formed therein along the circumference thereof and having a spherical inner surface concentric with the inner surface of said recess 12. The outer peripheral surface of the collar-like section 13 is also spherical in substantially concetrical relation with the inner peripheral surface thereof. The socket 10 further has an annular projection 14 surrounding the collar-like section 13 with an annular space 15 therebetween, and the outer surface of said projection 14 is formed with threads. Reference numeral 16 designates an annular special form nut having a U-shaped cross section and the inner surface of an outer flange 17 thereof is formed with threads. An inner flange 18 of the annular nut 16 is so shaped as to be fitted into the annular space 15. By screw-threading the inner surface of the outer flange 17 over the outer surface of the annular projection 14, the inner flange 18 is fitted into the annular groove 15 to press the collar-like section 13 externally. In the ball-and-socket joint constructed as described above, the driving force acting on the connecting rod 4, during operation of the wiper, creates a force acting in the direction U in which the socket 10 is disengaged from the ball 11, and a force acting in the opposite direction L. However, since the inner flange 18 of the special form nut 16 is tightly fitted in the annular space between the collar-like section 13 and the annular projection 14 to press said collar-like section externally, the outer expansion of said collar-like section is restrained and hence the socket 10 will not be disengaged from the ball 11 even if the force is exerted on said socket in the direction U.

On the other hand, when it is desired to disassemble the joint for replacing the component parts thereof or other reaons, the special form nut 16 is loosened, whereupon the collar-like section 13 is released from restraining force and allowed to expand outwardly when the socket 10 is pulled upwardly by lifting the connecting rod 4. Thus, the socket 10 can be easily disengaged from the ball 11. The socket 10 does not have a through-hole formed therein and the collar-like section at the open side of said socket is externally pressed by the special form nut 16 over the entire peripheral surface thereof. Therefore, even when the joint is used at a location where it is easily splashed with water, there is no possibility of a lubricant, such as grease, applied to the sliding surfaces of the socket and ball, being washed away by the water, nor is there the possibility of sand being allowed to intrude into the sliding surfaces even when the joint is used at a location where sand is easily attached to the joint. Hence, there is no possibility that the coefficient of friction increases resulting in a loss of driving force or lowering of durability of the joint.

Figure 6:
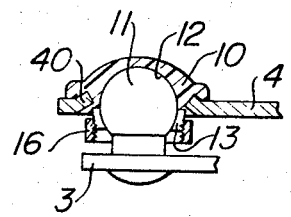
FIG. 6 is a cross-sectional view, similar to FIGS. 3 and 4, of another embodiment of the ball-and-socket joint of the invention.

Describing the second embodiment of the invention shown in FIG. 6, the collar-like section 13 of the socket 10 is formed with threads on the outer peripheral surface thereof and the nut 16 is screw-threaded over said collar-like section. Obviously, the structure shown in this Figure also enables the same functional effect as above described to be obtained, and in this case, a commonly used nut can be used. In the embodiment of FIG. 6, an annular projection indicated by numeral 40 may be formed around the hole of the connecting rod 4, so as to prevent the shrinkage of the socket 10 subsequent to molding when said socket is molded integrally with the connecting rod, and also to substantially increase the breadth of that portion of said connecting rod other than the portion where the hole is formed and thereby increase the strength of said portion by increasing the modulus of section at said portion.

Figure 7:
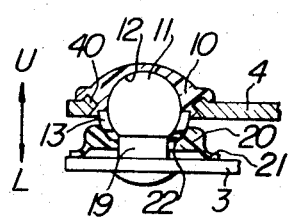
FIG. 7 is a cross-sectional view of still another embodiment of the invention.
Figure 8:
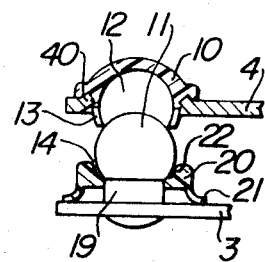
FIG. 8 is a view illustrating the manner of assembling the ball-and-socket joint of the structure shown in FIG. 7.

Next, the third embodiment of the invention will be described with reference to FIGS. 7 and 8. In this embodiment, a socket of an artifical resin similar to those in the preceding embodiments has a collar-like section of the same shape and has a recess 12 for receiving the ball 11 fixed on the crank arm 3. An annular stopper 20 made of an elastic deformable material, such as polyacetal or polyamide, is vertically slidably mounted around a cylindrical shunk 19 of the ball 11. The stopper 20 has a leaf spring-like arm 21 and a recessed portion 22 so shaped as to embrace the periphery of the collar-like section 13 of the socket 10.

The manner in which the ball-and-socket joint of the structure described above, will be explained with reference to FIG. 8. Before the ball 11 is received in the socket 10, the stopper 20 is urged toward the ball 11 under the biasing force of the arm 21 as shown in FIG. 7, and in this state an annular gap 14 is formed between said ball 11 and the recessed portion 22 of said stopper 20. The collar-like section 13 of the socket 10 is applied with force to the free end of the ball 11 under such condition, whereupon it is expanded due to its own elasticity and by the effect of the slits formed therein, and the ball 11 can be easily received in the recess 12. When the ball 11 has been received in the recess 12 to a certain extent, the edge of the collar-like section 13 abuts against the stopper 20, and further application of force to the socket causes deformation of the arm 21 of said stopper 20 and urges said stopper toward the crank arm 3. As a result, the gap 14 between the stopper 20 and the ball 11 becomes larger and the edge of the collar-like section 13 moves beyond the center of the ball 11 and fits into the recessed portion 22 of said stopper 20. Thus, the stopper 20 is coupled with the collar-like section 13 of the socket 10 in a manner to embrace the latter externally. Therefore, in the state of the joint wherein the ball 11 is completely received in the socket 10 as shown in FIG. 7, the expansion of the collar-like section 13 of said socket 10 is restrained by the stopper 20 and the socket 10 will not be disengaged from the ball 11 even when a force acts thereon in the direction of U or in the opposite direction L during operation of the wiper, due to the driving force acting on the connecting rod 4. On the other hand, where it is desired to disassemble the joint for replacing the component parts or other reasons, the arm 21 of the stopper is pushed toward the crank arm 3, whereby it is further deformed elastically and the recessed portion 22 is detached from the collar-like section 13 of the socket 10, allowing said collar-like section to expand. Therefore, the socket 10 and the ball 11 can be easily disengaged by pulling one of them from the other one. The socket 10 does not have a through-hole formed therein and the stopper 20 presses the collar-like section 13 in a manner to embrace it externally. Therefore, there is no possibility of a lubricant, such as grease, applied to the sliding surfaces of the socket and the ball, being washed away by water, nor is there the possibility of sand being allowed to intrude into said sliding surfaces. Hence, the disadvantage that the coefficient of friction at the sliding surfaces increases resulting in a loss of driving force of lowering of durability of the joint, can be avoided.

Figure 9:
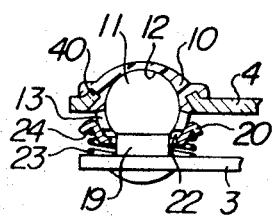
FIG. 9 is a cross-sectional view of still another embodiment of the invention.

The fourth embodiment of the invention will be described with reference to FIG. 9. In this embodiment, the stopper 20 is further provided with an annular recess 24 for holding a coil spring 23, in addition to the recessed portion 22 which presses the collar-like section 13 externally, and said stopper 20 is pressed against the outer peripheral surface of said collar-like section 13 under the biasing force of said coil spring 23 extended between it and the crank arm 3. By employing such structure, it will be obvious that the stopper 20 is not necessarily be molded of an elastic deformable material as is in the third embodiment but can be made from a highly rigid material such as an iron sheet.

Figure 10:
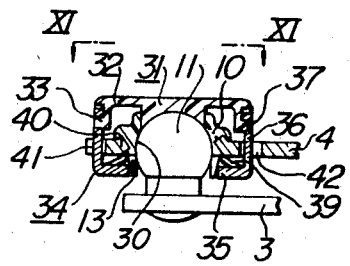
FIG. 10 is a cross-sectional view of still another embodiment of the invention.
Figure 11:
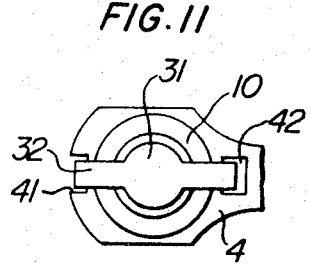
FIG. 11 is a plan view of the embodiment of FIG. 10, looking in the direction of XI—XI.
Figure 12:
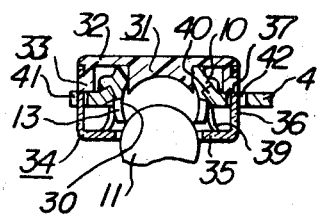
FIG. 12 is a view illustrating the manner of assembling the ball-and-socket joint of the structure shown in FIG. 10.

The fifth embodiment of the invention will be described with reference to FIGS. 10 – 12 hereunder:

In this embodiment, similar to the preceding embodiments, a ball 11 is fixed on the crank arm 3, while a socket 10 molded of a similar artificial resin is mounted in the hole of the connecting rod 4 by molding it integrally with or press-fitting it in the hole of said connecting rod 4, and has a through-hole 30 formed therein for receiving the ball 11. A cap 31 of a size just engageable in the hole of the socket, which is molded of an elastic deformable material, such as synthetic resin, is fitted in said hole from the same side as the free end of the ball 11. The cap 31 has two integral arms 32 and at the end of each arm 32 is provided a projection 33 extending at right angles to said arm. On the other side of the through-hole 30 of the socket 10 is formed a collar-like section 13 similar to those in the preceding embodiments, to facilitate the insertion of the ball 11 into said through-hole. In this embodiment, however, the outer periphery of the collar-like section is tapered. The outside of the collar-like section 13 is provided a stopper 34 which has formed at substantially the center thereof an opening for snugly receiving said collar-like section. The stopper 34 has an annular portion 35 defining the central opening and a band-like section 36 of a width substantially equal to the width of the arms 32 of the cap 31. The band-like section 36 extends at right angles to the annular portion 35 and has a hole 37 formed in each end thereof. The ends of the band-like section 36 of the stopper 34 are extended through a notch 41 and a hole 42 formed in the connecting rod 4 respectively, and the projections 33 formed at the ends of the respective arms 32 of the cap 31 are engaged in the holes 37 formed through the end portions of said band-like section 36 respectively. Whereby said cap 31 and said stopper 34 are coupled integrally with each other. Reference numeral 39 designates a plurality of elastic deformable tongues projecting from the periphery of the socket and formed integrally with said socket.

The manner in which the ball-and-socket joint of the structure described above is assembled, will be explained with reference to FIGS. 10 and 12. Before the ball 11 is inserted into the through-hole 30 of the socket 10, the stopper 34 is urged downwardly by the elastic tongues 39 as shown in FIG. 12. Therefore, the stopper 34 is separated from the collar-like section 13 of the socket 10 and the expansion of said collar-like section is not restrained by said stopper. When the ball 11 is forced into the collar-like section 13 of the socket 10 under such condition, said collar-like section is expanded due to the slits formed therein and its own elasticity, and the ball 11 can be easily inserted into the through-hole 30 of the socket 10. In this case, however, since the free end of the ball 11 pushes up the cap 31 which is assembled in a manner to close one side of the through-hole 30 of said socket 10, before it is completely inserted into said through-hole, the stopper 34 connected to said cap 31 is moved upward while deforming the elastic tongues 39, and tightly applied to the outer peripheral surface of the collar-like section 13. Therefore, in the state wherein the ball 11 is completely fitted into the socket 10, the expansion of the collar-like section 13 of said socket 10 is restrained by the stopper 34 and said stopper 34 presses said collar-like section when the socket tends to slip off the ball. Thus, the socket 10 will not be disengaged from the ball 11 even when it undergoes a force in the direction U or in the opposite direction L during operation of the wiper, due to the driving force acting on the connecting rod 4. This force becomes larger in proportion to the deviation between the operating planes of the balls 9 at the opposite ends of the connecting rod 4, and in this state, the crank arm 3 and the connecting rod 4 are not in parallel to each other as shown in FIG. 10 but said operating planes forms an angle to each other. It will be understood that if, in this case, the free end of the ball 11 is made flat instead of forming it uniformly in the spherical shape and the contacting portion of the cap 31 with the ball 11 is also made flat complementary to said flat free end of the ball, the force to lift the cap 31 can be increased in proportion to the angle formed by the connecting rod 4 and the crank arm 3, and the stopper 34 will presses the outer peripheral surface of the collar-like section 13 of the socket 10 with a stronger force, so that the possibility of the socket 10 slipping off the ball 11 can be completely eliminated even when the force to urge said socket to slip off said ball becomes large due to the increasing deviation between the operating planes. On the other hand, where it is desired to disassemble the joint for replacing the component parts or other reasons, the ends of the arms 32 of the cap 31 are pushed toward the crank arm 3, whereupon said arms 32 are deformed and the stopper 34 is allowed to move toward the crank arm 3, so that said stopper 34 is detached from the collar-like section 13 of the socket 10, providing for expansion of said collar-like section. Therefore, by pulling the socket 10 or ball 11 from one another, the collar-like section 13 is expanded easily and the socket 10 can be easily disengaged from the ball 11. Further, since the cap 31 is connected in such a manner as to close the through-hole of the socket 10, there is no possibility of a lubricant, such as grease, applied to the sliding surfaces of the socket 10 and the ball 11, being washed away by water or of sand intruding into said sliding surfaces, and hence a loss of driving force or lowering of durability of the joint due to increasing coefficient of friction at the sliding surfaces can be avoided.

In the embodiment described above, an annular projection 40 is formed along the peripheral edge of the hole formed in the connecting rod 4. This annular projection 40 serves to prevent shrinkage of the socket 10 subsquent to molding when said socket is molded concurrently with said connecting rod and also to substantially increase the breadth of that portion of the connecting rod other than the portion of said hole to increase the strength of said portion.

As described above, the ball-and-socket joint according to the instant invention can be assembled and disassembled with much ease, has excellent water- and dust-proof properties and eliminates the necessity of provision of a cover made of rubber or the like material. Furthermore, since the expansion of the collar-like section is restrained by pressing the outer peripheral surface externally, there is no fear of the ball and socket being disengaged from each other under a force applied thereto during operation of the wiper. The ball-and-socket joint of the invention is also advantageous in that, since the annular projecting shoulder which has been formed at the free end of the ball in the prior art joints, can be eliminated, the ball can be of a simple shape and hence can be machined easily.

I claim:

1. A ball-and-socket joint for use in coupling link members for driving a windshield wiper for vehicles, comprising a ball fixedly mounted on one of said link members, and a socket mounted in a hole formed at one end of the other link member to be pivotably connected to said one link member and having a recess for receiving said ball, said socket having an integral collar-like section extending outwardly from the peripheral edge of said recess and having a plurality of slits formed therein over the entire circumference thereof;

characterized in that means is provided adjacent the collar-like section for, upon completion of the connection of the ball and socket, restraining the outward expansion of said collar-like section by pressing it over the entire outer peripheral surface thereof; the socket including the collar-like section thereof, and said means, substantially covering the ball;

said socket being formed with a through-hole the peripheral surface of which defines a sliding surface of said ball receiving recess of the socket, and there being provided an elastically deformable cap engageable with the upper open end of said through-hole to close the same and an annular stopper operatively connected to said cap and surrounding said socket, said collar like section being restrained from outward expansion by said stopper.

2. A ball-and-socket joint for use in coupling link members for driving a windshield wiper for vehicles comprising a ball fixedly mounted on one of said link members, and a socket mounted in a hole formed at one end of the other link member to be pivotably connected to said one link member and having a recess for receiving said ball, said socket having an integral collar-like section extending outwardly from the peripheral edge of said recess and having a plurality of slits formed therein over the entire circumference thereof;

characterized in that means is provided adjacent the collar-like section for, upon completion of the connection of the ball and socket, restraining the outward expansion of said collar-like section by pressing it over the entire outer peripheral surface thereof; the socket including the collar-like section thereof, and said means, substantially covering the ball;

said socket having a plurality of integral tongues extending along the outer peripheral surface of the collar-like section from the peripheral edge of said recess from which said collar-like section extends outwardly, and the free ends of said tongues being in engagement with said stopper urging it to move away from said cap.

* * * * *

UNITED STATES PATENT OFFICE
CERTIFICATE OF CORRECTION

Patent No. 3,759,555  Dated September 18, 1973

Inventor(s) Isao Ito

It is certified that error appears in the above-identified patent and that said Letters Patent are hereby corrected as shown below:

In the heading:

Item (73), change "Nilkondenso Kabushiki Kaisha" to

--Nippondenso Kabushiki Kaisha--.

Signed and sealed this 2nd day of April 1974.

(SEAL)
Attest:

EDWARD M. FLETCHER, JR.
Attesting Officer

C. MARSHALL DANN
Commissioner of Patents